M. J. B. BARBAROU.
ARTICULATION BETWEEN A PISTON AND ITS CONNECTING ROD.
APPLICATION FILED OCT. 31, 1918.
1,331,555.  Patented Feb. 24, 1920.
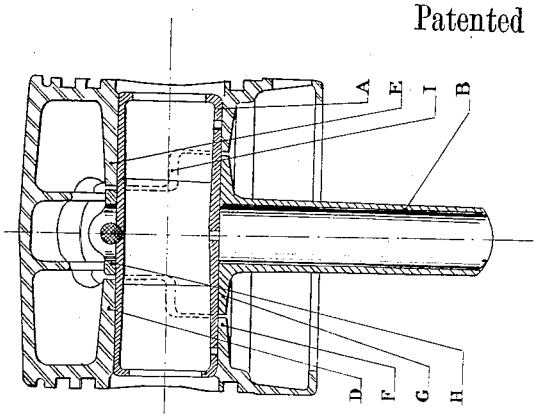
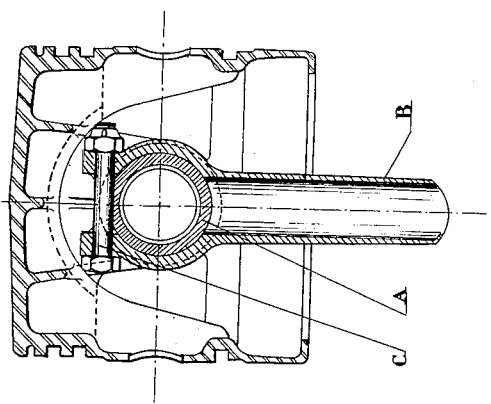
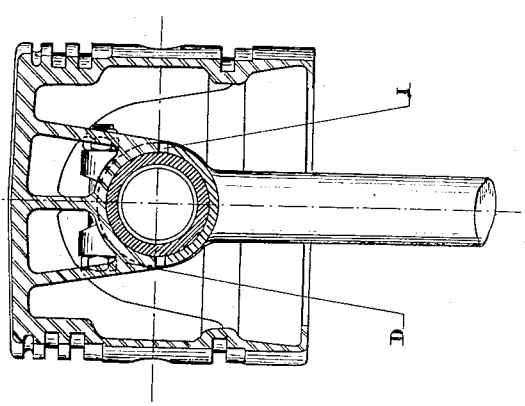
Inventor
Marius Jean Baptiste Barbarou
by Ottomunk
his Attorney

UNITED STATES PATENT OFFICE.

MARIUS JEAN BAPTISTE BARBAROU, OF NEUILLY-SUR-SEINE, FRANCE.

ARTICULATION BETWEEN A PISTON AND ITS CONNECTING-ROD.

1,331,555.  Specification of Letters Patent.  Patented Feb. 24, 1920.

Application filed October 31, 1918. Serial No. 260,574.

*To all whom it may concern:*

Be it known that I, MARIUS JEAN BAPTISTE BARBAROU, a citizen of the Republic of France, residing at No. 24 Rue St. James, Neuilly-sur-Seine, France, have invented new and useful Improvements in Articulations Between Pistons and Their Connecting-Rods, of which the following is a specification.

This invention has for its object to provide an improved articulation between a piston and its connecting rod of the kind wherein the piston pin is fixed to the connecting rod.

According to this invention which is more particularly applicable to internal combustion engines, those parts of the connecting rod and of the piston that are subject to the greatest strains, are made with a larger bearing surface than the parts that are subjected only to strains produced by the momentum or inertia of the moving masses.

In the accompanying drawings which are given solely by way of example:

Figures 1 and 2 are two sections of the general arrangement of the improved mounting, taken in planes at right angles to the piston pin.

Fig. 3 is a section in a plane parallel to the piston pin.

As shown in the drawings, the piston pin A is fixed to the connecting rod B; the connection between the two parts being assured by the bolt C in such a manner that the piston pin A can oscillate in the bosses D of the piston instead of being fixed to the said bosses and oscillating in the foot of the connecting rod.

The improvement on this construction consists in the following peculiarity:—In the piston bosses the upper bearing surface E (which bears upon the piston pin at the instant of the explosion; that is to say at the instant when the load is greatest) is longer than the lower bearing surface F which is subjected practically to only the strains due to the momentum of the piston at the instant of the termination of the upstroke.

On the other hand the tube that constitutes the foot of the connecting rod is so designed that the lower part G of this tube has a larger bearing surface than the upper part H. This difference in the lengths of the parts is due to the same reasons, because during the power stroke the piston pin being pushed back by the piston, bears against the lower part of the foot of the connecting rod.

In order to carry these conditions into effect, the piston bosses and the feet of the connecting rod are cut in the shape of a Z, as indicated in Fig. 3.

It is to be understood that a certain amount of "play" I is provided between the horizontal portions of the Z-shaped cut in the piston and in the foot of the connecting rod, for the purpose of allowing the connecting rod to oscillate. A certain amount of lateral "play" is likewise provided between the vertical portions of the Z-shaped cut in the bosses and the foot of the connecting rod, for the purpose of allowing for the longitudinal displacements that are caused by the different expansions of the various parts of the engine.

Having now described my invention, what I claim as new and desire to secure by Letters Patent is:

1. An articulation between the piston and its connecting rod of an explosion motor comprising in combination a hollow piston body, coaxial tubular bosses solid with the piston body and extending inwardly, a connecting rod provided with an annular foot arranged between the inner ends of said bosses, a piston pin fixed in said annular foot and having its ends journaled freely in said bosses, the parts of the bosses formed at the outer end of the piston having a larger bearing surface upon the piston pin than the parts of said bosses which are formed toward the inner end of the piston, and the part of the annular foot of the connecting rod which is nearest the shank of said rod having a larger bearing surface than the part which is diametrically opposed thereto substantially as described and for the purpose set forth.

2. An articulation between the piston and its connecting rod of an explosion motor comprising in combination a hollow piston body, coaxial tubular bosses solid with the piston body and extending inwardly, a connecting rod provided with an annular foot arranged between the inner ends of said bosses, a piston pin fixed in said annular foot and having its ends journaled freely in said bosses, the annular foot of the connecting rod being cut at its ends so as to present on the side toward the rod shank a greater length than on the opposite side, and the tubular bosses of the piston being cut at their ends in a corresponding manner, substantially as described and for the purpose set forth.

3. An articulation between the piston and its connecting rod of an explosion motor comprising in combination a hollow piston body, coaxial tubular bosses solid with the piston body and extending inwardly, a connecting rod provided with an annular foot arranged between the inner ends of said bosses, a piston pin fixed in said annular foot and having its ends journaled freely in said bosses, each end of the annular foot of the connecting rod being cut to present approximately an ogee edge and the inner ends of the annular bosses being cut in a corresponding manner, substantially as described and for the purpose set forth.

In testimony whereof I have signed my name to this specification.

MARIUS JEAN BAPTISTE BARBAROU.